(12) United States Patent
Tsumiyama et al.

(10) Patent No.: US 9,744,939 B1
(45) Date of Patent: Aug. 29, 2017

(54) UTILITY VEHICLE

(71) Applicant: KAWASAKI JUKOGYO KABUSHIKI KAISHA, Hyogo (JP)

(72) Inventors: Yoshinori Tsumiyama, Miki (JP); Takashi Hisamura, Kakogawa (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 15/153,821

(22) Filed: May 13, 2016

(51) Int. Cl.
*B60R 22/34* (2006.01)
*B60N 2/38* (2006.01)
*B60N 2/68* (2006.01)
*B60R 22/26* (2006.01)
*B60N 2/44* (2006.01)

(52) U.S. Cl.
CPC ............... *B60R 22/34* (2013.01); *B60N 2/38* (2013.01); *B60N 2/449* (2013.01); *B60N 2/688* (2013.01); *B60R 22/26* (2013.01)

(58) Field of Classification Search
CPC ........... B60R 22/34; B60R 22/26; B60N 2/38; B60N 2/449; B60N 2/688
See application file for complete search history.

(56) References Cited

U.S. PATENT DOCUMENTS

| D439,548 S * | 3/2001 | Kouchi | D12/1 |
| 6,517,111 B2 * | 2/2003 | Mizuta | B62D 23/005 |
| | | | 180/311 |
| 6,994,388 B2 | 2/2006 | Saito et al. | |
| 7,578,523 B2 * | 8/2009 | Kosuge | B62D 21/186 |
| | | | 280/756 |
| 7,578,544 B1 * | 8/2009 | Shimamura | B60N 2/305 |
| | | | 296/183.2 |
| 8,979,123 B1 * | 3/2015 | Takahashi | B62D 23/005 |
| | | | 280/748 |
| 2006/0060018 A1 * | 3/2006 | Miyazaki | F16H 59/04 |
| | | | 74/473.1 |
| 2010/0096200 A1 * | 4/2010 | Bombarda | B62J 17/08 |
| | | | 180/65.31 |
| 2012/0032431 A1 * | 2/2012 | King | B60J 5/0487 |
| | | | 280/756 |
| 2012/0032465 A1 * | 2/2012 | Morita | B60P 3/423 |
| | | | 296/26.09 |
| 2013/0168168 A1 * | 7/2013 | Takagi | B60K 6/22 |
| | | | 180/65.245 |
| 2013/0168951 A1 * | 7/2013 | Yamamoto | B60R 22/24 |
| | | | 280/807 |
| 2015/0274121 A1 * | 10/2015 | Kuroda | B60R 22/023 |
| | | | 297/391 |

* cited by examiner

*Primary Examiner* — Faye M Fleming
(74) *Attorney, Agent, or Firm* — Wenderoth, Lind & Ponack, L.L.P.

(57) ABSTRACT

A utility vehicle is provided with a hip guard member disposed adjacent to a seat for a crew member and guarding the crew member sitting on the seat from outside in a vehicle width direction. The utility vehicle includes: a seat frame provided below the seat and supporting the seat; and a seatbelt apparatus configured to hold the crew member sitting on the seat. The seatbelt apparatus includes a retractor supporting an end of webbing so as to freely wind the webbing. The retractor is attached to the seat frame, and the retractor projects outward in the vehicle width direction from the hip guard member.

5 Claims, 8 Drawing Sheets

UTILITY VEHICLE

BACKGROUND OF THE INVENTION

1. Field of the Invention

The present invention relates to a utility vehicle.

2. Description of the Related Art

As disclosed in U.S. Pat. No. 6,994,388, a utility vehicle including a seat in a bench shape has conventionally been provided with a lap belt configured to hold knees of a crew as a seatbelt apparatus configured to hold a crew sitting on the seat.

SUMMARY OF THE INVENTION

In a case where the seatbelt apparatus includes a retractor supporting an end of webbing so as to freely wind the webbing, the retractor is typically assumed to be attached to a hip guard member laterally guarding a crew sitting on a seat. In this case, the retractor and the body of the crew guarded by the hip guard member interfere with each other to deteriorate riding comfort of the crew.

In view of this, it is an object of the present invention to provide a utility vehicle that prevents interference between the retractor and a crew sitting on the seat and improves riding comfort of the crew.

In order to achieve the object mentioned above, the present invention provides a utility vehicle provided with a hip guard member disposed adjacent to a seat for a crew and guarding the crew sitting on the seat from outside in a vehicle width direction, the utility vehicle including:

a seat frame provided below the seat and supporting the seat; and a seatbelt apparatus configured to hold the crew sitting on the seat; in which the seatbelt apparatus includes a retractor supporting an end of webbing so as to freely wind the webbing, the retractor is attached to the seat frame, and the retractor projects outward in the vehicle width direction from the hip guard member.

In this configuration, the retractor projects outward in the vehicle width direction from the hip guard member. This configuration prevents interference between the retractor and the hip of the crew held by the hip guard member to improve riding comfort of the crew.

The utility vehicle according to the present invention is preferred to further include any of the following configurations.

(1) The seat frame includes a projection projecting outward in the vehicle width direction from the seat and covering a top of a fuel tank, and the retractor is attached to the projection.

(2) The retractor includes a webbing support located inside in the vehicle width direction with respect to an end surface in the vehicle width direction of the projection.

(3) The retractor and the hip guard member each have an inner end surface in the vehicle width direction, and the inner end surfaces in the vehicle width direction are flush with each other and are located outside in the vehicle width direction with respect to an end surface in the vehicle width direction of the seat in a top view.

(4) The seat has a bench shape, the seat has a left portion serving as a seating area for a driver, the seat is provided with a hand brake that is located outside to the left in the vehicle width direction, the retractor of the seatbelt apparatus for the driver is attached to the seat frame, and the retractor for the driver is located behind the hand brake.

In the configuration (1), the retractor is attached to the projection projecting outward in the vehicle width direction from the seat. This configuration prevents interference between the retractor and the crew sitting on the seat to improve riding comfort of the crew.

In the configuration (2), the webbing support of the retractor is located inside in the vehicle width direction with respect to the end surface in the vehicle width direction of the projection to restrain collision between the webbing support and foreign matter outside the vehicle.

In the configuration (3), the inner end surface in the vehicle width direction of the retractor and the inner end surface in the vehicle width direction of the hip guard member are flush with each other and are located outside in the vehicle width direction with respect to the end surface in the vehicle width direction of the seat in a top view, to more reliably prevent interference between the retractor and the crew sitting on the seat.

In the configuration (4), the retractor is located behind the hand brake in the seat side area where the hand brake is located outside in the vehicle width direction of the seat, to prevent interference between the retractor and the driver who manipulates the hand brake.

The present invention thus provides a utility vehicle that prevents interference between the retractor and a crew sitting on a seat and improves riding comfort of the crew.

DETAILED DESCRIPTION OF THE INVENTION

[Vehicle Entire Structure]

Figure 1:
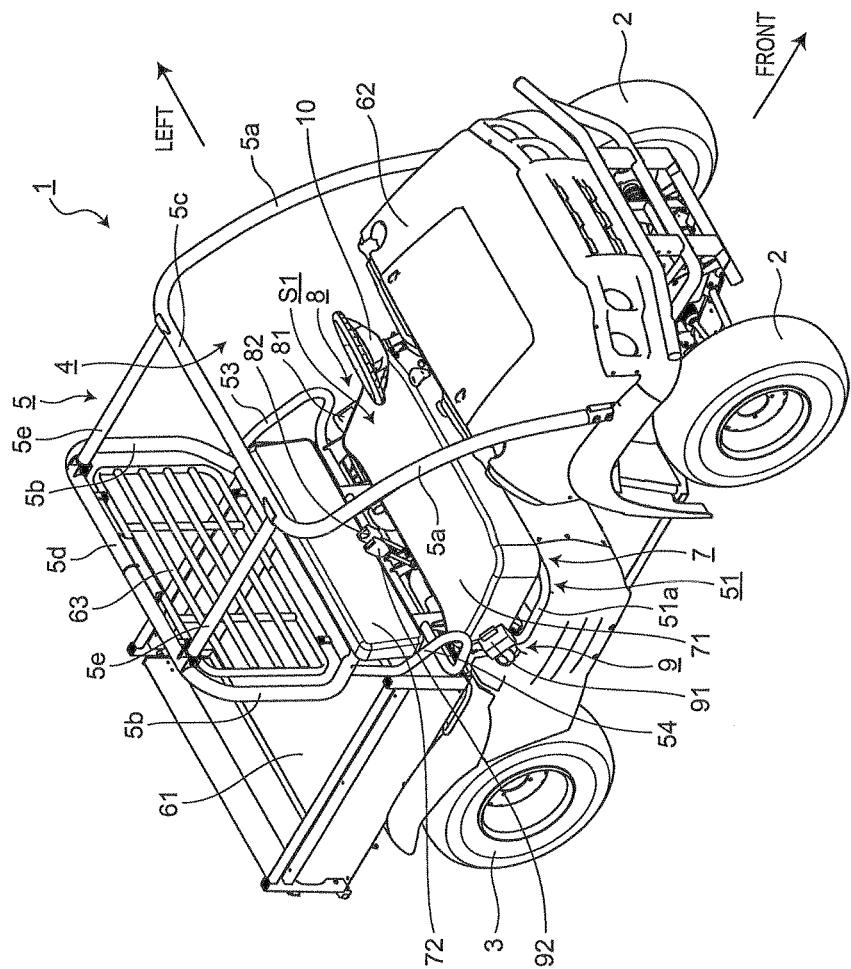
FIG. 1 is a perspective view of a utility vehicle according to an embodiment of the present invention.
Figure 2:
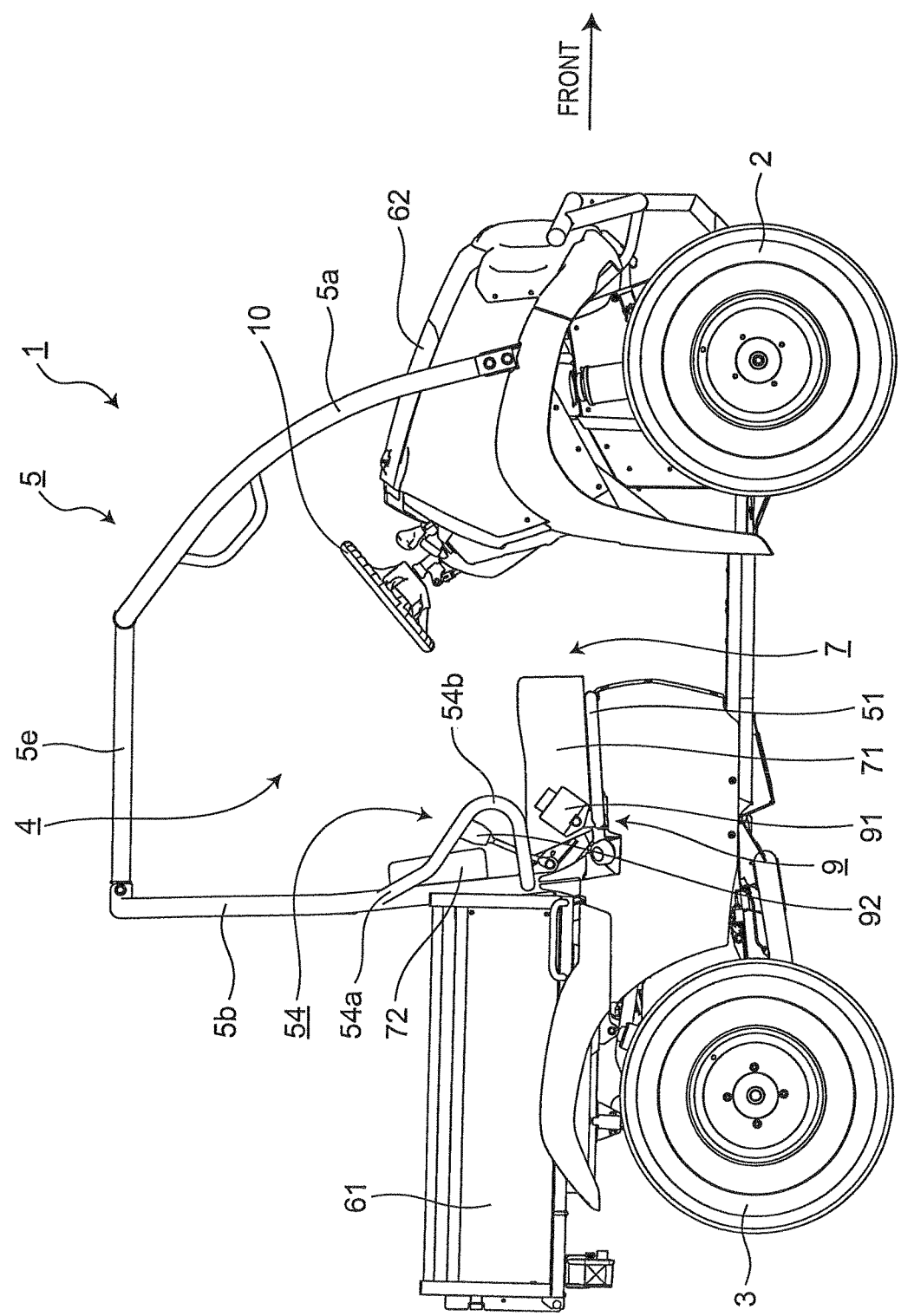
FIG. 2 is a right side view of the utility vehicle shown in FIG. 1.
Figure 3:
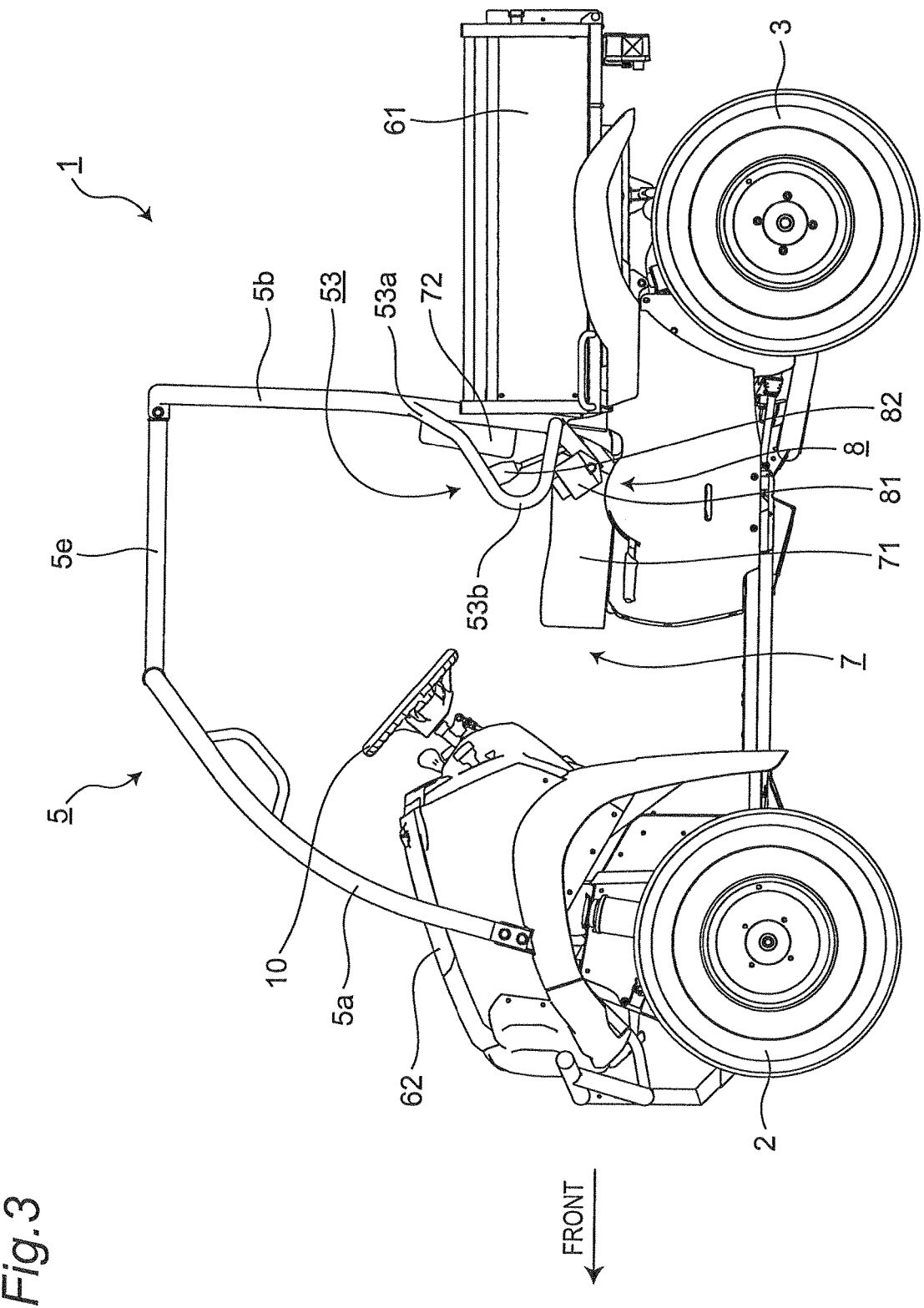
FIG. 3 is a left side view of the utility vehicle shown in FIG. 1.
Figure 4:
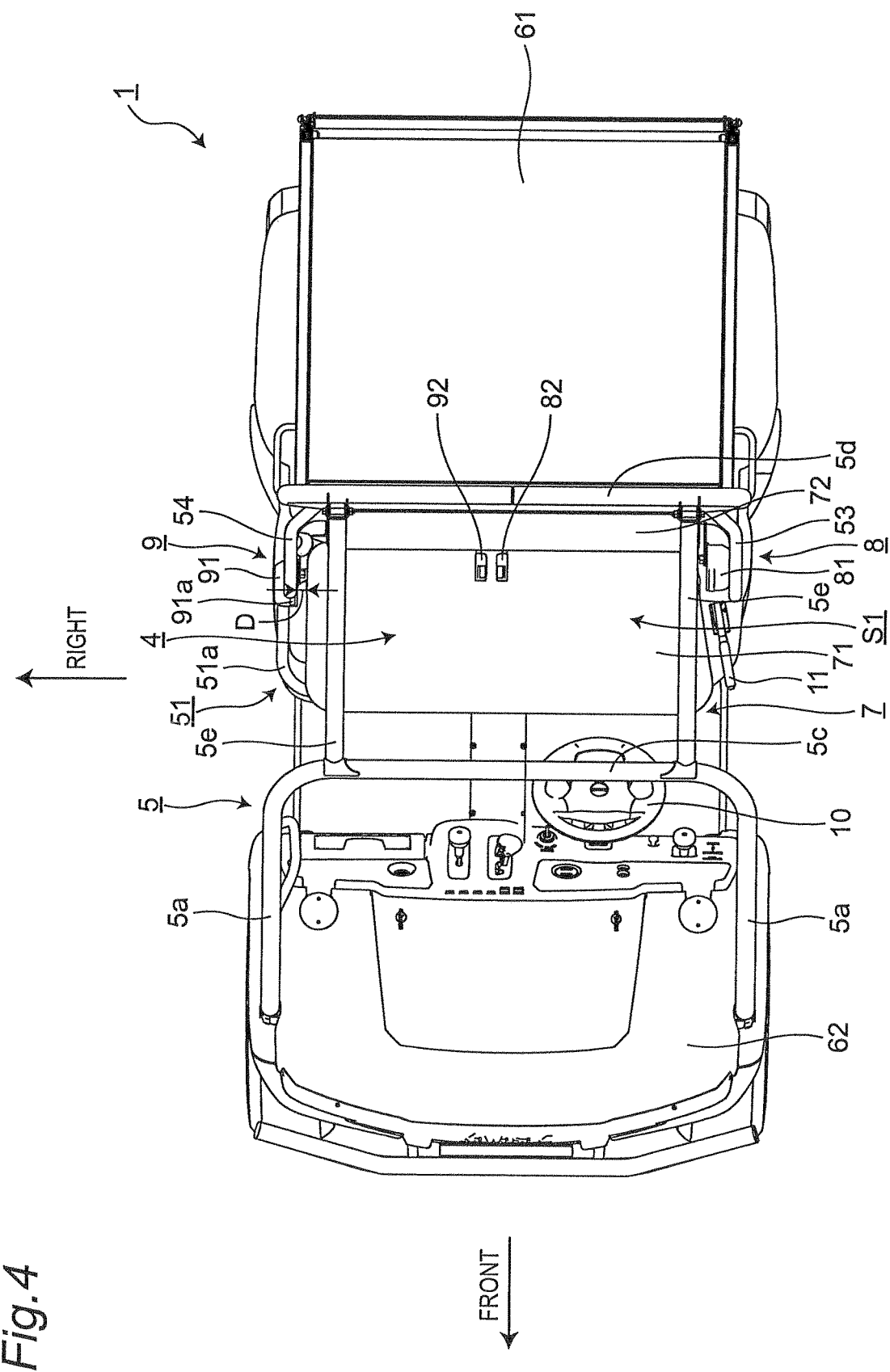
FIG. 4 is a top view of the utility vehicle shown in FIG. 1.

FIG. 1 is a perspective view of a utility vehicle according to an embodiment of the present invention. Assume that the concept of directions according to the present embodiment matches the concept of directions viewed from a driver of the utility vehicle. FIG. 2 is a right side view of the utility vehicle shown in FIG. 1, whereas FIG. 3 is a left side view of the utility vehicle shown in FIG. 1. FIG. 4 is a top view of the utility vehicle shown in FIG. 1.

As shown in FIGS. 1 to 4, a utility vehicle 1 includes a pair of right and left front wheels 2 at a vehicle front portion, a pair of right and left rear wheels 3 at a vehicle rear portion, and a riding space (cabin) 4 between the front wheels 2 and the rear wheels 3. The riding space 4 is surrounded with a ROPS 5. The ROPS is an abbreviation for a rollover protective structure. The ROPS 5 configures part of a chassis frame, and includes a pair of right and left front vertical members 5a, a pair of right and left rear vertical members 5b, a front lateral member 5c coupling the front vertical members 5a and extending in the vehicle width direction, a rear lateral member 5d coupling the rear vertical members 5b and extending in the vehicle width direction, and a pair of right and left upper end beam members 5e coupling the front lateral member 5c and the rear lateral member 5d and extending in the anteroposterior direction.

The riding space 4 is provided therebehind with a cargo bed 61, and is provided thereahead with a bonnet 62. The cargo bed 61 is provided, at its front end, with a screen 63 partitioning between the riding space 4 and the cargo bed 61. The riding space 4 accommodates a bench type seat 7. The seat 7 has a left seating area S1 serving as a driver's seat. The seating area S1 is provided thereahead with an operation unit including a steering wheel 10 and the like.

[Structure of Seat and the Periphery Thereof]

Figure 5:
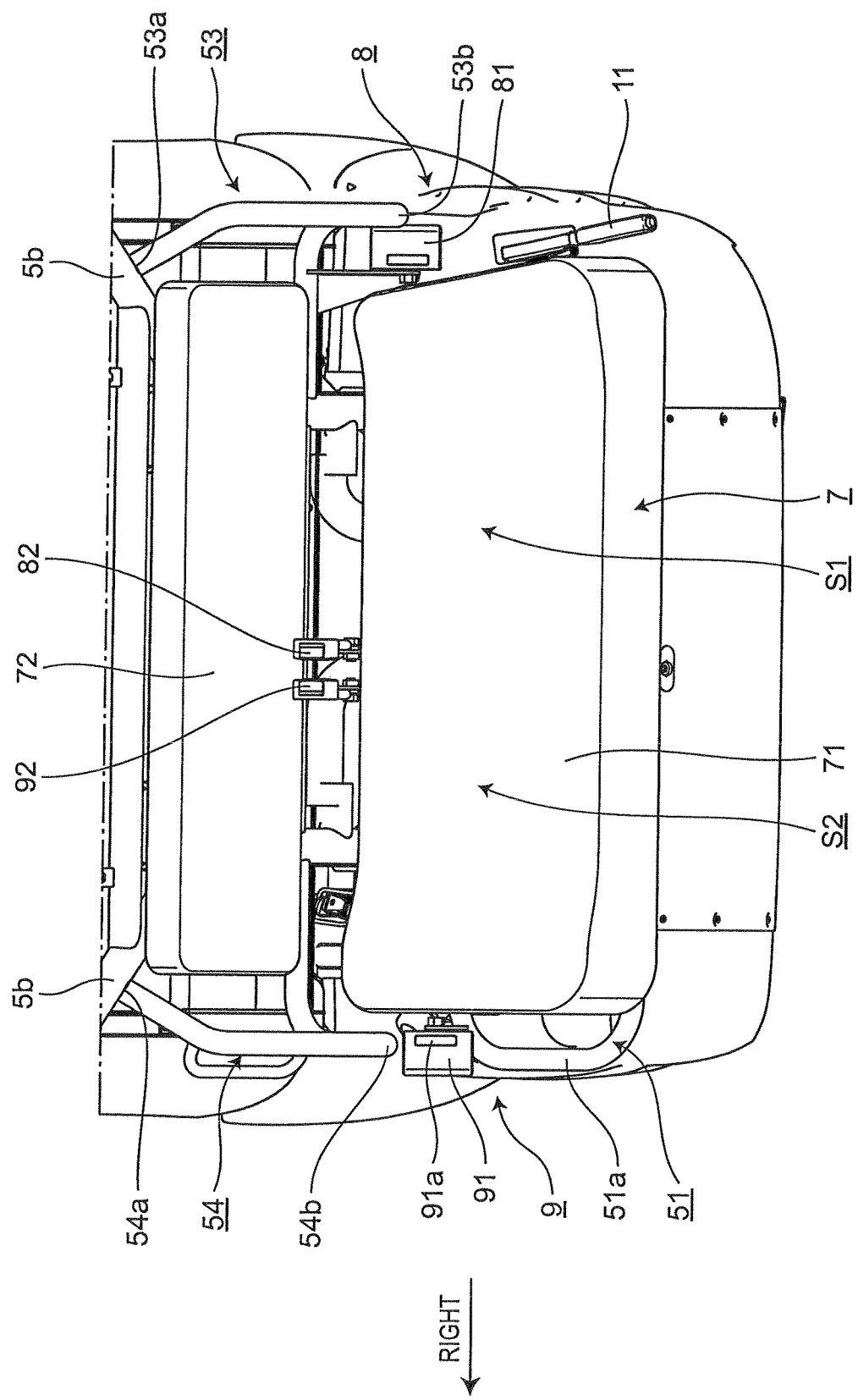
FIG. 5 is a front perspective view of a seat and the periphery thereof.
Figure 6:
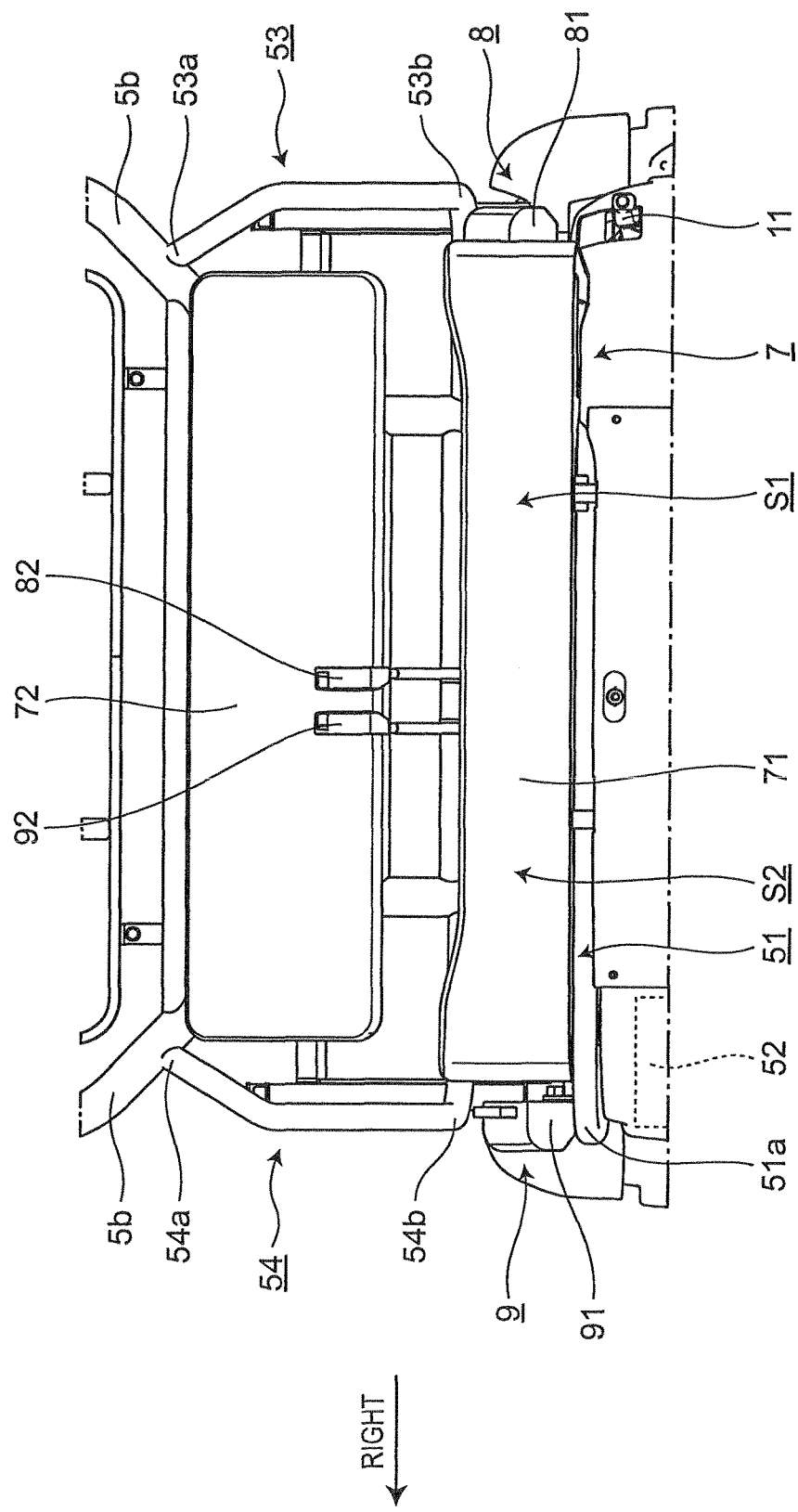
FIG. 6 is a front view of the seat and the periphery thereof.

FIG. 5 is a front perspective view of the seat 7 and the periphery thereof, and FIG. 6 is a front view of the seat 7 and the periphery thereof. As shown in FIGS. 5 and 6, the seat 7 includes a seat bottom 71 in a rectangular shape extending in the vehicle width direction (right-left direction), and a backrest 72 in a rectangular shape extending in the right-left direction. The bench type seat 7 accommodates two persons, and has the left seating area S1 for the driver and a right seating area S2 for a passenger. The seating area S1 and the seating area S2 are provided with a seatbelt apparatus 8 for the driver and a seatbelt apparatus 9 for the passenger, respectively.

Figure 7:
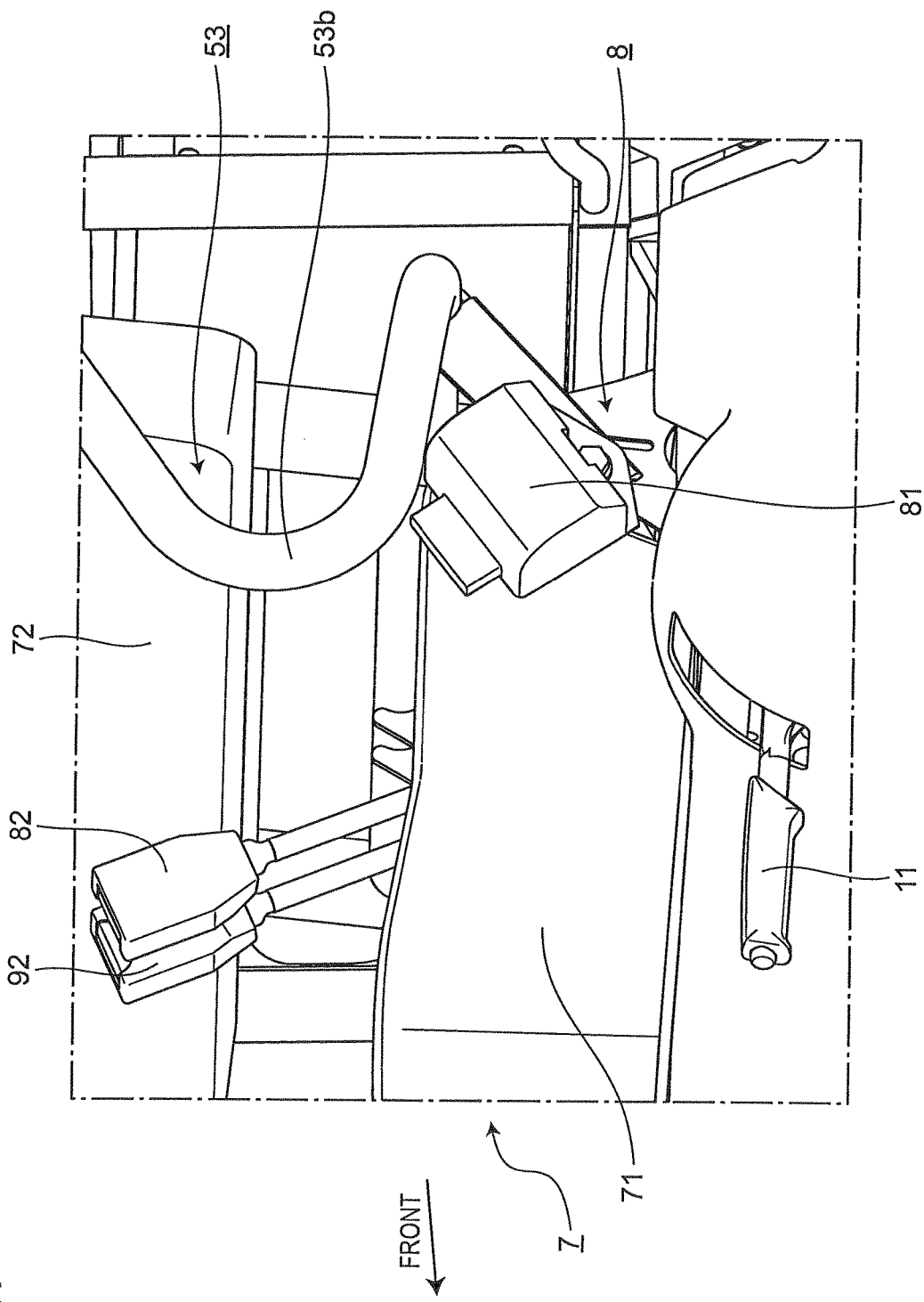
FIG. 7 is a perspective view of a retractor and the periphery thereof of a seatbelt apparatus for a driver.

The seatbelt apparatus 8 for the driver includes a retractor 81 supporting a first end of webbing (not shown) so as to freely wind the webbing, and a buckle 82 configured to detachably couple a tongue plate (not shown) attached to a second end of the webbing. FIG. 7 is a perspective view of the retractor 81 and the periphery thereof of the seatbelt apparatus 8 for the driver.

Figure 8:
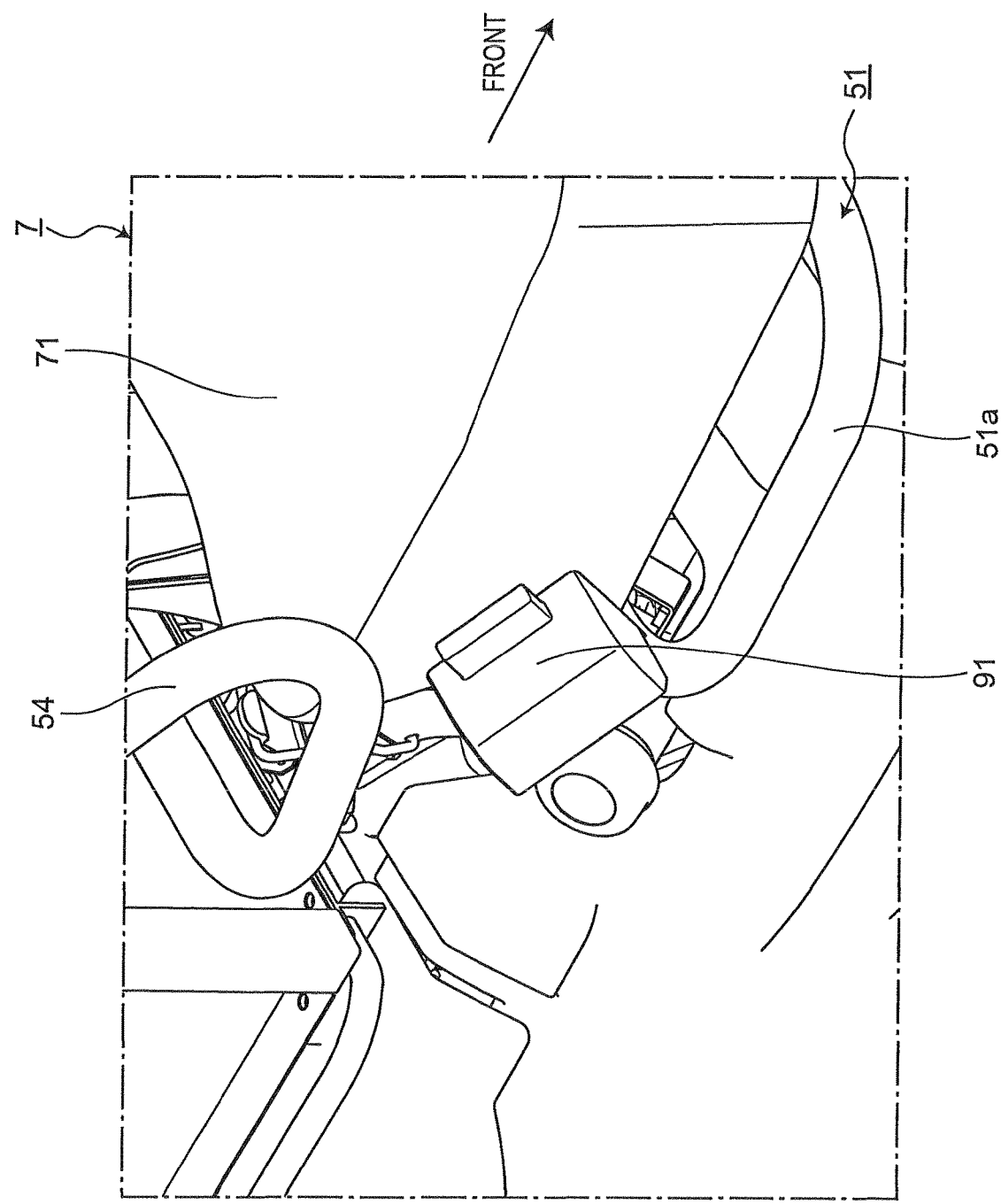
FIG. 8 is a perspective view of a retractor and the periphery thereof of a seatbelt apparatus for a passenger.

The seatbelt apparatus 9 for the passenger similarly includes a retractor 91 supporting a first end of webbing (not shown) so as to freely wind the webbing, and a buckle 92 configured to detachably couple a tongue plate (not shown) attached to a second end of the webbing. FIG. 8 is a perspective view of the retractor 91 and the periphery thereof of the seatbelt apparatus 9 for the passenger.

The buckle 82 and the buckle 92 are aligned in the right-left direction, are attached to a rear end substantially at the center in the right-left direction of the seat bottom 71, and project upward from the seat bottom 71. As shown in FIG. 6, the buckles 82 and 92 have upper ends located below the center in the vertical direction of the backrest 72.

The seat bottom 71 is provided therebelow with a seat frame 51 supporting the seat bottom 71. The seat frame 51 is a columnar pipe in an annular rectangular shape extending in the right-left direction. The seat bottom 71 is attached to the seat frame 51. The seat frame 51 includes a projection 51a projecting rightward and outward from the seat bottom 71. In other words, the projection 51a is located outside to the right with respect to the right end of the seat bottom 71. As shown in FIG. 6, the projection 51a is provided therebelow with a fuel tank 52. The projection 51a covers the top of the fuel tank 52 to protect the fuel tank 52 from impact from upward.

The seat 7 is provided, near and outside the left and right ends, with hip guard members 53 and 54, respectively. The hip guard members 53 and 54 guard crews sitting on the seat 7 from outside in the right-left direction. The hip guard member 53 is provided for the driver, and has an upper end 53a that is coupled to a corresponding one of the rear vertical members 5b at a position close to the upper end of the backrest 72 in a side view, as shown in FIG. 3. The hip guard member 53 has a curved portion 53b that curvedly extends downward and forward from the upper end 53a, crosses the upper end of the buckle 82, and curves from the front to the rear near the upper end of the seat bottom 71 in a side view. The hip guard member 53 extends backward from the curved portion 53b along the upper end of the seat bottom 71 and is coupled to the rear vertical member 5b.

The hip guard member 54 is provided for the passenger, and has an upper end 54a that is coupled to the remaining one of the rear vertical members 5b at a position close to the upper end of the backrest 72 in a side view, as shown in FIG. 2. The hip guard member 54 has a curved portion 54b that curvedly extends downward and forward from the upper end 54a, crosses the upper end of the buckle 92, and curves from the front to the rear near the upper end of the seat bottom 71 in a side view. The hip guard member 54 extends backward from the curved portion 54b along the upper end of the seat bottom 71 and is coupled to the rear vertical member 5b.

As shown in FIG. 4, the retractor 81 is attached to the rear left end of the seat frame 51 and is located inside to the right with respect to the left end surface of the hip guard member 53. As shown in FIG. 3, the upper end of the retractor 81 crosses a portion extending backward from the curved portion 53b of the hip guard member 53 in a side view.

As shown in FIG. 4, the retractor 91 projects rightward and outward from the hip guard member 54. The left end surface of the retractor 91 and the left end surface of the hip guard member 54 are flush with each other in a top view. The left end surface of the retractor 91 and the left end surface of the hip guard member 54 are located outside to the right with respect to the right end surface of the seat bottom 71 of the seat 7. The seat bottom 71 and the retractor 91 are thus provided therebetween with a clearance D having a predetermined length in the right-left direction. As shown in FIG. 2, the retractor 91 is located below a portion extending backward from the curved portion 54b of the hip guard member 54.

The retractor 91 is attached to the rear end of the projection 51a of the seat frame 51. The retractor 91 supporting the first end of the webbing so as to freely wind the webbing has a webbing support 91a that is located inside in the vehicle width direction with respect to the right end surface of the projection 51a. The right end surface of the retractor 91 is substantially flush with the right end surface of the projection 51a.

There is provided a hand brake 11 that is located outside to the left with respect to the seat bottom 71 of the seat 7. The retractor 81 is located behind the hand brake 11. The retractor 81 and the hand brake 11 are located substantially at an identical position in the right-left direction.

The utility vehicle thus configured achieves the following effects.

(1) The retractor 91 projects outward in the vehicle width direction from the hip guard member 54. This configuration prevents interference between the retractor 91 and the hip of the crew held by the hip guard member 54 to improve riding comfort of the crew.

(2) The retractor 91 is attached to the projection 51a of the seat frame 51. This configuration prevents interference between the retractor 91 and the crew sitting on the seat 7 to improve riding comfort of the crew.

(3) The webbing support 91a of the retractor 91 is located inside in the vehicle width direction with respect to the end surface in the vehicle width direction of the projection 51a of the seat frame 51 to restrain collision between the webbing support 91a and foreign matter outside the vehicle.

(4) The inner end surface in the vehicle width direction of the retractor 91 and the inner end surface in the vehicle width direction of the hip guard member 54 are flush with each other and are located outside in the vehicle width direction with respect to the end surface in the vehicle width direction of the seat bottom 71 of the seat 7 in a top view. The clearance D is thus provided between the end surface in the vehicle width direction of the seat bottom 71 of the seat 7 and the inner end surfaces in the vehicle width direction of the retractor 91 and the hip guard member 54. This configuration more reliably prevents interference between the retractor 91 and the crew sitting on the seat 7.

(5) The retractor 81 is located behind the hand brake 11 in the seat side area where the hand brake 11 is located outside in the vehicle width direction of the seat 7, to prevent interference between the retractor 81 and the driver who manipulates the hand brake 11.

(6) The retractors 81 and 91 are attached to the seat frame 51 whereas the buckles 82 and 92 are attached to the rear end substantially at the center in the right-left direction of the seat bottom 71. This configuration allows the webbing to maintain its fixing function as well as prevents the webbing from having a length beyond necessity. This configuration further achieves reduction in material cost for the webbing as well as reduction in size of the retractors 81 and 91.

Each of the retractors 81 and 91 according to the embodiment described above is applicable to a three-point seatbelt apparatus as well as to a two-point seatbelt apparatus.

The seat frame 51 according to the above embodiment is not provided with any projection projecting leftward and outward from the driver's seating area of the seat 7. There is optionally provided a projection projecting leftward and outward from the seat 7, in which case the retractor 81 for the driver may be attached to the projection.

The seat 7 according to the above embodiment has the bench shape. The seat 7 alternatively has a box shape.

The utility vehicle 1 according to the above embodiment includes the seat 7 configuring a single seat row. The utility vehicle 1 alternatively includes seats configuring two or more seat rows. In this case, a seat frame of the seat in a second or subsequent row optionally has a projection projecting leftward and outward from the seat as well as a projection projecting rightward and outward from the seat. Retractors for passengers may be attached to these projections.

The present invention can be modified or changed in various manners without departing from the spirit and scope of the present invention recited in the following patent claims.

The invention claimed is:

1. A utility vehicle provided with a hip guard member disposed adjacent to a seat for a crew and guarding the crew sitting on the seat from outside in a vehicle width direction, the utility vehicle comprising:
   a seat frame provided below the seat and supporting the seat; and
   a seatbelt apparatus configured to hold the crew sitting on the seat; wherein
   the seatbelt apparatus includes a retractor supporting an end of webbing so as to freely wind the webbing, the retractor is attached to the seat frame, and
   the retractor projects outward in the vehicle width direction from the hip guard member.

2. The utility vehicle according to claim 1, wherein
   the seat frame includes a projection projecting outward in the vehicle width direction from the seat and covering a top of a fuel tank, and
   the retractor is attached to the projection.

3. The utility vehicle according to claim 2, wherein
   the retractor includes a webbing support located inside in the vehicle width direction with respect to an end surface in the vehicle width direction of the projection.

4. The utility vehicle according to claim 1, wherein
   the retractor and the hip guard member each have an inner end surface in the vehicle width direction, and the inner end surfaces in the vehicle width direction are flush with each other and are located outside in the vehicle width direction with respect to an end surface in the vehicle width direction of the seat in a top view.

5. The utility vehicle according to claim 1, wherein
   the seat has a bench shape,
   the seat has a left portion serving as a seating area for a driver,
   the seat is provided with a hand brake that is located outside to the left in the vehicle width direction,
   the retractor of the seatbelt apparatus for the driver is attached to the seat frame, and
   the retractor for the driver is located behind the hand brake.

* * * * *